UNITED STATES PATENT OFFICE.

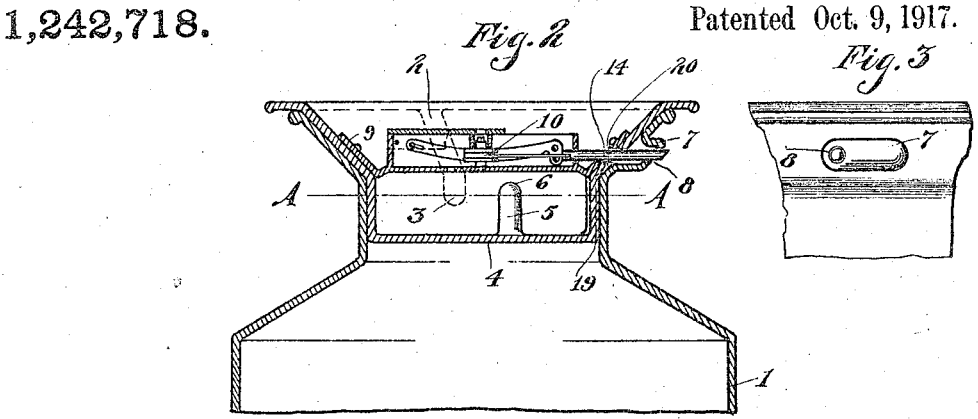
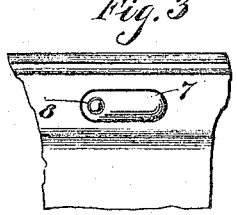
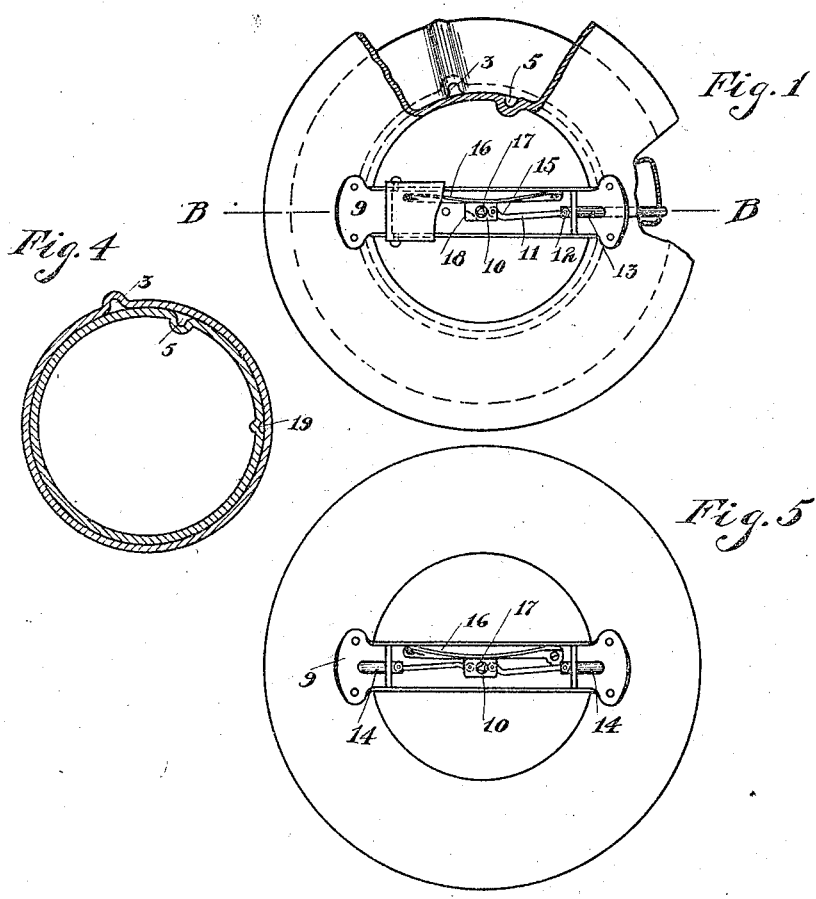

FREDERICK N. OLESEN, OF ST. PAUL, MINNESOTA.

MILK-RECEPTACLE AND LOCK.

1,242,718.  Specification of Letters Patent.  Patented Oct. 9, 1917.

Application filed November 8, 1916. Serial No. 130,168.

*To all whom it may concern:*

Be it known that I, FREDERICK N. OLESEN, a citizen of Norway, residing at St. Paul, in the county of Ramsey and State of Minnesota, have invented certain new and useful Improvements in Milk-Receptacles and Locks, of which the following is a specification.

One object of my invention is to provide in a milk receptacle having a cover, means for securely locking the cover to the receptacle.

Another object of my invention is to provide in a milk receptacle having a cover, a three positioned lock, one position of which will allow the cover to be turned in the receptacle, but not removed therefrom.

Another object of my invention is to provide in a milk receptacle having a cover, channels formed in the receptacle cover, so that when the channels register together, milk may be poured from the receptacle without removing the cover.

Another object of my invention is to provide in a milk receptacle having a cover, a vent for gases that may arise from the milk during transit.

With these and incidental objects in view the invention consists of certain novel features of construction and combination of parts, the essential elements of which are hereinafter described with reference to the drawing which accompanies and forms a part of this specification.

In the drawing, Figure 1 is a plan view of a milk receptacle and cover embodying my invention, with fragments broken away to better show the construction.

Fig. 2 is a section taken on the line "B B," Fig. 1.

Fig. 3 is an enlarged detail of that portion of the receptacle wherein the lock bolt registers.

Fig. 4 is a section taken on the line "A A," Fig. 2, and Fig. 5 is a plan view of the cover showing an alternate construction of the lock bolt.

In utilizing my invention to the best advantage, I prefer to form in a milk receptacle 1 of ordinary construction, a channel 2, Figs. 1 and 2, leading from the lip of the receptacle down into the neck portion thereof, as indicated at 3, Fig. 2.

I also form in the cover 4, Fig. 1, a channel 5, leading from the bottom of the cover, up to and somewhat above the point 3, where the channel of the receptacle ends.

An examination of Fig. 2 will show that point 3 is considerably below the point 6, at which the channel in the cover ends, so it is evident that if the cover is rotated in the receptacle until these channels register, milk may be poured out through what would then be a continuous channel formed of the two channels 5 and 2. If, however, the cover and receptacle are in the position shown in Fig. 2, the channels are sealed, so that milk cannot be poured therethrough.

I also form out around the lip of the receptacle, a channel 7, Figs. 2 and 3, having an aperture 8 at one end thereof. A handle 9, Fig. 1, has pinioned thereon, a block 10, as better shown in Fig. 2, and at one end of the block 10 is hinged a link 11, the other end of which is hinged at 12 to the lock bolt 13, extending through the cover plate at 14, Fig. 2.

Link 11 is bent at point 15, Fig. 1, and a spring 16, suitably mounted in the handle serves to retain the block 10 in whatever position it might be placed.

A key fitting the shank 17, carried by block 10, facilitates the turning or positioning of this block, and it may be positioned, as shown in Fig. 2, in which the lock bolt 13 is fully extended, or it may be positioned with the end 18 bearing against the spring 17, or may be completely reversed from the position shown in Fig. 1, the three positions being called, respectively; extended, central and retracted.

Referring to Fig. 2, it is seen that the bolt shown there in its extended position, extends through the aperture 8 in the channel 7 of the receptacle. If the block 10 is in its central position, the lock bolt will extend into the channel 7, but not into the aperture 8, so that the cover may be turned in the receptacle within the limits of the motion of the lock bolt in the channel 7, and this limit is such that it allows the channels 2 and 5 in the receptacle and cover, respectively, to be registered.

When the bolt 14 is in its retracted position, the cover can be lifted freely from the receptacle in the ordinary manner.

As gas is sometimes given off by milk during transit under certain conditions, I also provide a small groove 19, Figs. 4 and 2, which extends from the bottom of the cover up to the aperture in the cover provided for the lock bolt.

I may depend entirely upon a slight looseness in fit of the lock bolt and the aperture through the cover, or I may here provide an aperture 20 drilled through the lock bolt 14 and registering with the groove 19 when the lock bolt is in its extended position.

As a stronger method of locking the cover, I can use two lock bolts 14, Fig. 5, linked to the block 10, as heretofore described for the bolt, providing of course two apertures in the cover and receptacle.

While I have described my invention and illustrated it in one particular design, I do not wish it understood that I limit myself to this construction, as the application of my invention may be varied in many ways within the scope of the following claims:

Claims:

1. In a milk receptacle having a cover, the combination of a handle mounted in said cover, a lock bolt mounted in said handle, a channel running circumferentially around said receptacle and having an aperture at one end thereof to allow said lock bolt to pass therethrough.

2. In a milk receptacle having a cover, the combination of a handle, a lock bolt carried therein, a neck portion in said receptacle, and a flanged circular lip portion in said receptacle, a portion of said cover being formed to fit said neck, a channel formed outwardly and vertically in the flanged lip of said receptacle and extending downwardly through a part of the neck portion of said receptacle, a channel formed vertically and inwardly, in the lower portion of said cover, registering with said neck portion of said receptacle, said channel extending higher in said cover than the lower end of said channel formed in said receptacle.

3. In a milk receptacle having a cover, the combination of a handle, a lock bolt carried therein, a neck portion in said receptacle, and a flanged circular lip portion in said receptacle, a portion of said cover being formed to fit said neck, a channel formed vertically and outwardly in the flanged lip of said receptacle and extending downwardly through a part of the neck portion of said receptacle, a channel formed vertically and inwardly in the lower portion of said cover, registering with said neck portion of said receptacle, said channel extending higher in said cover than the lower end of said channel formed in said receptacle, and means in said receptacle controllable by said lock bolt for allowing the turning of said cover in said neck portion, so that the channels in said receptacle and said cover will register, while said cover and said receptacle are locked together.

4. In a milk receptacle having a cover, the combination of a lock bolt, an air vent extending upwardly between said cover and said receptacle and registering with an aperture through said lock bolt when said lock bolt is in its locked position.

5. In a milk receptacle, having a cover, the combination of a handle, a lock bolt having an extended, a retracted and a central position controllable by a key, a channel formed outwardly in said receptacle, said channel running circumferentially in said receptacle and having an aperture at one end thereof, a vertical channel formed outwardly in said receptacle, a vertical channel formed inwardly in said cover, the upper end of said channel in said cover being higher than the lower end of the channel in said receptacle, so as to form a continuous channel when said two channels are registered, whereby said cover may be turned so that said lock bolt registers with the aperture in the circumferential channel of said receptacle and lock in said position, or said bolt may be turned to its central position, whereby said cover remains locked to said receptacle, but may be turned therein, and the channels in said cover and said receptacle register, or said bolt may be retracted and said cover removed from said receptacle.

FREDERICK N. OLESEN.

Copies of this patent may be obtained for five cents each, by addressing the "Commissioner of Patents, Washington, D. C."